US007775102B2

(12) United States Patent
Haerer

(10) Patent No.: US 7,775,102 B2
(45) Date of Patent: Aug. 17, 2010

(54) METHOD FOR TESTING A HIGH-PRESSURE PUMP IN A FUEL SYSTEM

(75) Inventor: Frank Haerer, Lorch-Waldhausen (DE)

(73) Assignee: Robert Bosch GmbH, Stuttgart (DE)

( * ) Notice: Subject to any disclaimer, the term of this patent is extended or adjusted under 35 U.S.C. 154(b) by 358 days.

(21) Appl. No.: 11/659,358

(22) PCT Filed: Jun. 13, 2005

(86) PCT No.: PCT/EP2005/052705

§ 371 (c)(1), (2), (4) Date: Feb. 5, 2007

(87) PCT Pub. No.: WO2006/015893

PCT Pub. Date: Feb. 16, 2006

(65) Prior Publication Data

US 2007/0243077 A1 Oct. 18, 2007

(30) Foreign Application Priority Data

Aug. 5, 2004 (DE) ...................... 10 2004 037 963

(51) Int. Cl.
*G01M 19/00* (2006.01)

(52) U.S. Cl. ........................................ 73/168; 417/225

(58) Field of Classification Search ............... 73/114.41
See application file for complete search history.

(56) References Cited

U.S. PATENT DOCUMENTS 5,359,883 A * 11/1994 Baldwin et al. .......... 73/114.16
2001/0023684 A1 9/2001 Demura et al.
2005/0103313 A1 5/2005 Lemoure

FOREIGN PATENT DOCUMENTS

| | | | |
|---|---|---|---|
| DE | 102 54 464 | A1 | 7/2003 |
| EP | 1 136 686 | A2 | 9/2001 |
| EP | 1 441 120 | A2 | 7/2004 |
| EP | 1441120 | A2 * | 7/2004 |
| JP | 8503053 | | 4/1996 |
| JP | 2002106446 | A | 4/2002 |
| JP | 200484538 | A | 3/2004 |
| WO | WO 2004/036034 | A1 | 4/2004 |

* cited by examiner

*Primary Examiner*—Hezron Williams
*Assistant Examiner*—Mark Shabman
(74) *Attorney, Agent, or Firm*—Ronald E. Greigg

(57) ABSTRACT

A method for testing the function of a high-pressure pump having a plurality of pump elements, which each define a respective work chamber which is in communication, via a suction valve with a low-pressure region, from which fuel can be aspirated, and via a pressure valve with a high-pressure region which includes a central high-pressure fuel reservoir, serving to supply fuel to an internal combustion engine, into which high-pressure reservoir the high-pressure pump pumps the fuel aspirated from the low-pressure region, and the pressure of which is detected by a rail pressure sensor. The values detected by the rail pressure sensor are used in the built-in state of the high-pressure pump in operation of the engine for testing the function of the high-pressure pump.

15 Claims, 4 Drawing Sheets

METHOD FOR TESTING A HIGH-PRESSURE PUMP IN A FUEL SYSTEM

CROSS-REFERENCE TO RELATED APPLICATION

This application is a 35 USC 371 application of PCT/EP 2005/052705 filed on Jun. 13, 2005.

BACKGROUND OF THE INVENTION

1. Field of the Invention

The invention relates to a method for testing the function of a high-pressure pump having a plurality of pump elements, which each define a respective work chamber which is in communication, via a suction valve with a low-pressure region, from which fuel can be aspirated, and via a pressure valve with a high-pressure region which includes a central high-pressure fuel reservoir (rail), serving to supply fuel to an internal combustion engine, into which high-pressure reservoir the high-pressure pump pumps the fuel aspirated from the low-pressure region, and the pressure of which is detected by a rail pressure sensor.

2. Prior Art

In conventional testing methods, the high-pressure pump is removed from the internal combustion engine and tested on a special test stand.

The object of the invention is to furnish a method for testing the function of a high-pressure pump having a plurality of pump elements, which each define a respective work chamber which is in communication, via a suction valve with a low-pressure region, from which fuel can be aspirated, and via a pressure valve with a high-pressure region which includes a central high-pressure fuel reservoir (rail), serving to supply fuel to an internal combustion engine, into which high-pressure reservoir the high-pressure pump pumps the fuel aspirated from the low-pressure region, and the pressure of which is detected by a rail pressure sensor, which can be performed simply and economically and nevertheless makes a reliable statement to be made about the functional capability of the high-pressure pump.

SUMMARY AND ADVANTAGES OF THE INVENTION

In a method for testing the function of a high-pressure pump having a plurality of pump elements, which each define a respective work chamber which is in communication, via a suction valve with a low-pressure region, from which fuel can be aspirated, and via a pressure valve with a high-pressure region which includes a central high-pressure fuel reservoir (rail), serving to supply fuel to an internal combustion engine, into which high-pressure reservoir the high-pressure pump pumps the fuel aspirated from the low-pressure region, and the pressure of which is detected by a rail pressure sensor, this object is attained in that the values detected by the rail pressure sensor are used in the built-in state of the high-pressure pump in operation of the engine for testing the function of the high-pressure pump. As a result, the removal of the high-pressure pump and the special test stand can both be dispensed with.

A preferred exemplary embodiment of the method is characterized in that an adapter is connected to the rail pressure sensor in order to forward the pressure values detected to an external evaluation unit. The adapter is for example an intermediate plug, with an interface for a connection cable, in particular an oscilloscope cable. The evaluation unit is preferably an oscilloscope, or a testing device with the function of an oscilloscope. It is also possible to use a control unit that is integrated with the engine.

A further preferred exemplary embodiment of the method is characterized in that the testing is done in the idling mode of the engine. The testing can also be done in other defined operating states of the engine. However, in the context of the present invention, unambiguous results were attained upon testing while idling.

A further preferred exemplary embodiment of the method is characterized in that the raw signal of the rail pressure sensor is used as the measured value for the rail pressure. In the context of the present invention, it was discovered that the signal of the rail pressure sensor, from a control unit belonging to the internal combustion engine, was only limitedly usable for testing the function of the high-pressure pump. With the raw signal of the rail pressure sensor, markedly better results were attained, especially at relatively high step-up ratios between the pump rpm and the engine rpm.

A further preferred exemplary embodiment of the method is characterized in that a pressure regulating valve, with which the high-pressure pump is equipped, is opened in order to increase the pumping quantity of the high-pressure pump. In the open state, the pressure regulating valve opens up a connection between the high-pressure region and the low-pressure region. By the purposeful opening of the pressure regulating valve, the pumping quantity of the high-pressure pump is artificially increased.

A further preferred exemplary embodiment of the method is characterized in that the pumping quantity of the high-pressure pump is increased by opening a pressure limiting valve, with which the high-pressure fuel reservoir is equipped. The pressure limiting valve is closed in normal operation of the engine, and for safety reasons it does not open until a maximum allowable pressure, for example of 1800 bar, in the high-pressure fuel reservoir is exceeded. The pressure limiting valve then regulates the pressure in the high-pressure fuel reservoir to a reduced value, for instance of 800 bar, in order to make emergency operation possible. The pumping quantity of the high-pressure pump is artificially increased by the purposeful opening of the pressure limiting valve.

A further preferred exemplary embodiment of the method is characterized in that a metering unit, which is connected upstream of the high-pressure pump, is opened, in order to increase the pumping quantity of the high-pressure pump, until the pressure limiting valve opens. Via the opened metering unit, more fuel reaches the preferably suction-throttled high-pressure pump than is needed for instance in the idling mode of the engine. The artificially increased pumping quantity quickly causes the pressure limiting valve to open.

BRIEF DESCRIPTION OF THE DRAWINGS

Further advantages, characteristics and details of the invention will become apparent from the ensuing description, taken in conjunction with the drawings, in which.

DESCRIPTION OF THE PREFERRED EMBODIMENTS

Figure 1:
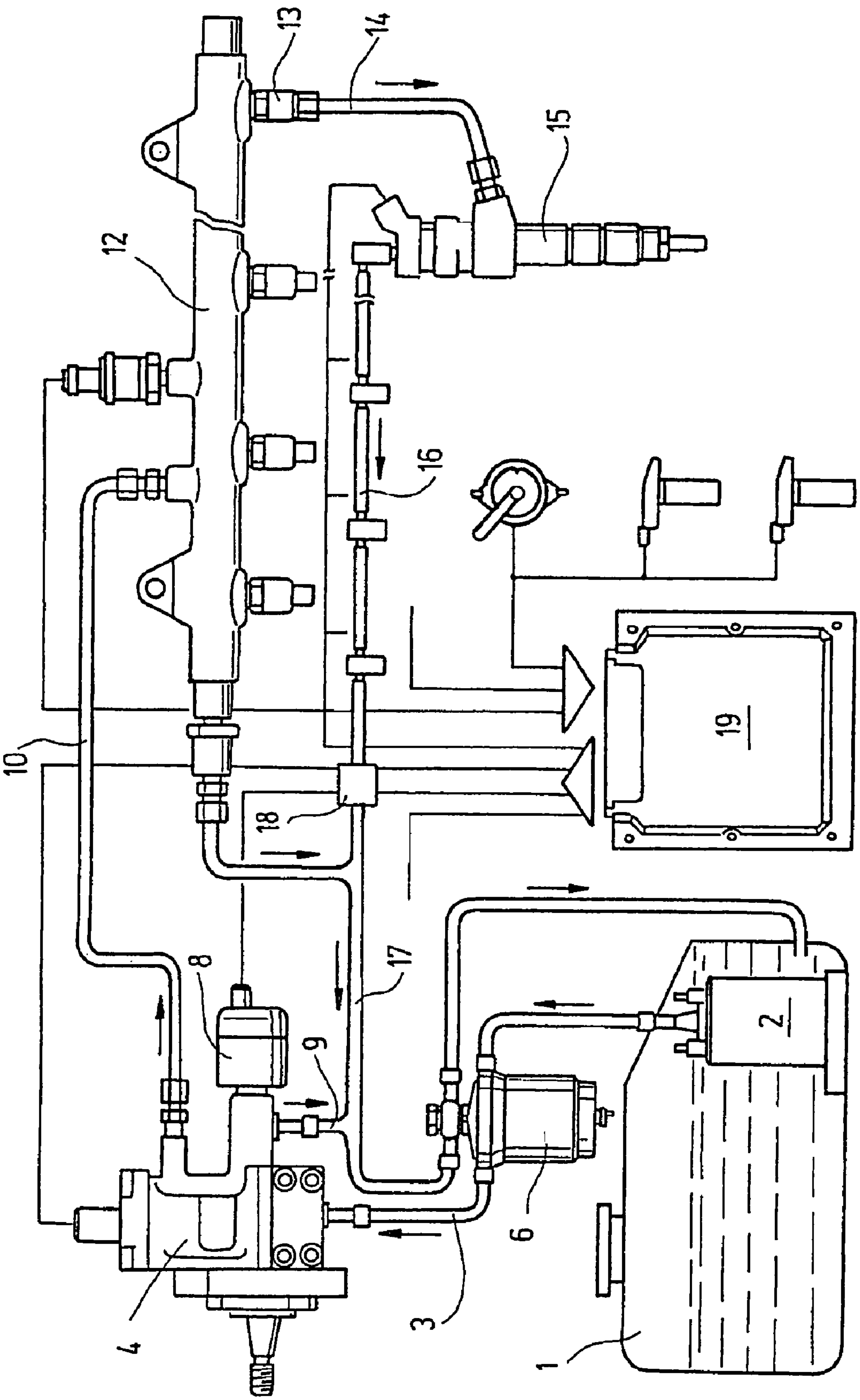
FIG. 1 is a schematic illustration of a fuel injection system, with a high-pressure pump which has a pressure regulating valve.

In FIG. 1, a common rail fuel injection system is shown schematically. From a low-pressure container 1, which is also called the fuel tank, with the aid of a fuel feed pump 2 via a connecting line 3, fuel is pumped to a high-pressure pump 4. An overflow valve 6 is disposed in the connecting line 3. The low-pressure container 1, the fuel feed pump 2, and the connecting line 3 are subjected to low pressure and are therefore associated with the low-pressure region.

A pressure regulating valve 8 is mounted on the high-pressure pump 4 and is connected to the low-pressure container 1 via a line 9. A high-pressure line 10 also begins at the high-pressure pump 4 and furnishes the fuel, subjected to high pressure, to a high-pressure fuel reservoir 12, which is also known as a common rail. From the high-pressure reservoir 12, with the interposition of flow limiters 13, high-pressure lines 14 lead away, which furnish the fuel, subjected to high pressure, from the high-pressure reservoir 12 to injection valves 15, which are also known as injectors and of which for the sake of simplicity only one is shown in FIG. 1. The high-pressure line 10, the high-pressure reservoir 12, the high-pressure line 14, and the injection valve 15 contain fuel subjected to high pressure and are accordingly associated with the high-pressure region of the fuel injection system.

From the fuel injection valve 15, a return line, which has two portions 16 and 17, leads to the low-pressure region 1. A pressure holding valve 18 is connected between the two portions 16 and 17 of the return line. The pressure holding valve 18 serves to maintain a minimum pressure in the portion 16 of the return line of approximately 1.0 bar. The operation of the fuel injection system is controlled by an electronic control unit 19.

Figure 2:
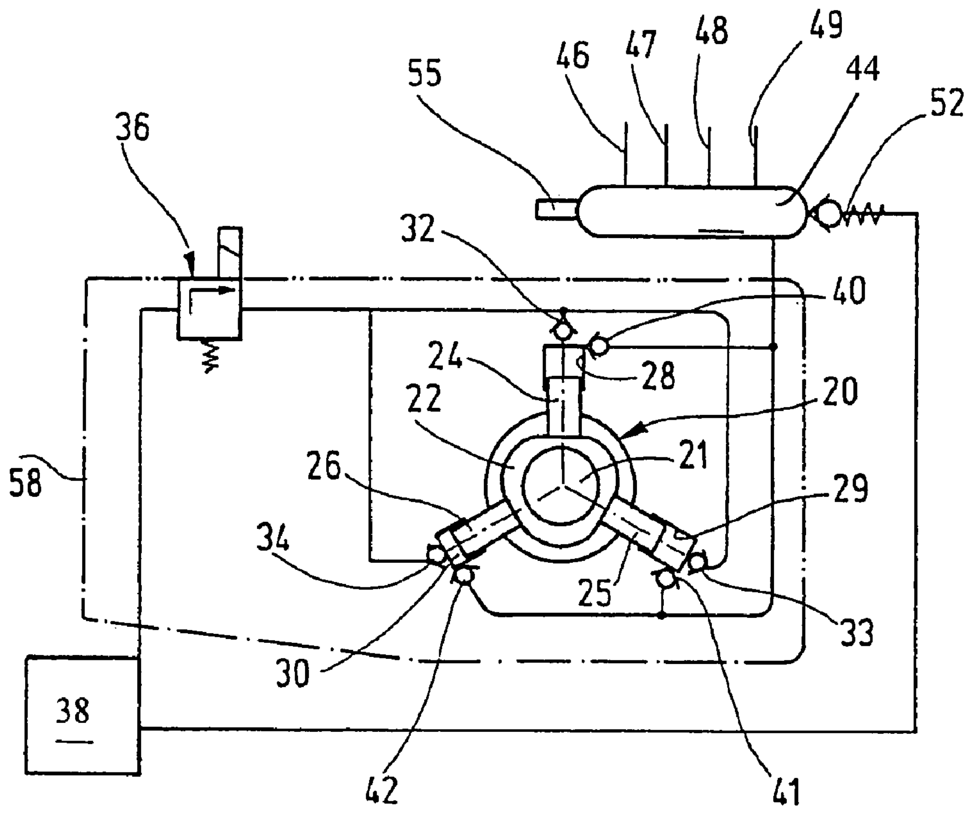
FIG. 2, a schematic illustration of a fuel injection system, with a high-pressure pump, upstream of which a metering unit is connected.

In FIG. 2, a fuel injection system similar to that in FIG. 1 is shown. The fuel injection system includes a high-pressure pump 20, which is driven by a drive shaft 21, which has an external shaft portion 22. The ends of three pistons 24, 25 and 26, arranged in a star pattern, are in contact with the external shaft portion 22. The ends of the pistons 24 through 26 remote from the drive shaft 21 define work chambers 28, 29 and 30, which are also called pump chambers. The work chambers 28 through 30 are each in communication, via a respective suction valve 32, 33 and 34 and with the interposition of a metering unit 36, with a low-pressure region 38.

The work chambers 28 through 30 furthermore communicate, via pressure valves 40 through 42, with a high-pressure fuel reservoir 44, which is also known as a common rail, or rail for short. From the high-pressure fuel reservoir 44, high-pressure lines 46 through 49 lead to fuel injection valves (not shown). The high-pressure fuel reservoir 44 communicates with the low-pressure region 38 via a pressure limiting valve 52. A rail pressure sensor 55 is also mounted on the high-pressure fuel reservoir 44, and by way of it the pressure in the high-pressure fuel reservoir 44 is detected.

The high-pressure pump 20 serves to pump fuel out of the low-pressure region 38 into the high-pressure fuel reservoir 44. Upon fuel intake, the suction valves 32 through 34 open, while the pressure valves 40 through 42 are conversely closed. Via the metering unit 36, the pumping quantity of the high-pressure pump 20 can be controlled. When fuel is pumped into the high-pressure fuel reservoir 44, the suction valves 32 through 34 are closed and the pressure valves 40 through 42 are open. A dot-dashed line 58 indicates that the metering unit 36, the suction valves 32 through 34, and the pressure valves 40 through 42 are integrated with the high-pressure pump 20.

In the testing method of the invention, the high-pressure pump, in idling mode of the vehicle, is tested without access to the control unit integrated into the vehicle, and without removing the high-pressure pump from the vehicle. The pumping quantity of the high-pressure pump is artificially increased in testing, by opening either the pressure limiting valve 52 (see FIG. 2) or the pressure regulating valve 8 (see FIG. 1). In the process, the pressure regulating valve must be constantly supplied with current, or a switch to pressure regulation with the pressure regulating valve must be made. The switch to the pressure regulating valve regulation can be done automatically when the metering unit is unplugged. As a result, it is possible to assess the function of the suction valves and pressure valves separately, as will be explained below. It is also possible, with the aid of suitable software functions, to automate the course of the test.

In the testing method of the invention, a rail pressure sensor cable adapter is used as an intermediate plug, with a pickup for an oscilloscope cable. For evaluating the signals of the rail pressure sensor, an oscilloscope is used. Alternatively, an oscilloscope function of an existing testing device can be used.

The method according to the invention functions as follows: The engine is in the idling mode. The rail pressure sensor cable adapter is plugged in. In a first measurement, the pressure limiting valve is closed. The engine runs at 600 rpm. The step-up ratio between the pump rpm and the engine rpm is 5:3. Accordingly, the high-pressure pump runs at 1000 rpm. 1000 rpm is equivalent to 16.66 revolutions per second. Thus if the pressure valve is defective, for instance if particles have become stuck in the valve or the seat is not tight, a characteristic rail pressure oscillation occurs at 16.66 revolutions per second. The frequency of this oscillation is independent of whether it is a suction valve or a pressure valve that is defective. The associated period is 0.06 seconds. At this point in operation, the rail pressure is measured synchronously with injection, or in other words shortly before each injection. Injection takes place upon every second revolution. As a result, for six cylinders, there are five injections per second for each cylinder, and hence thirty injections per second in all. This is equivalent to 30 Hz or 0.033 seconds. The oscillation can thus be only inadequately detected via the rail pressure sensor signal by the control unit integrated into the internal combustion engine. In addition, the signal is filtered once again in the control unit. Especially at step-up ratios higher than 5:3, detection via the control unit cannot be recommended. Therefore in an exemplary embodiment of the method of the invention, the raw signal of the rail pressure sensor is used as the measured value for the rail pressure, rather than the signal from the control unit integrated into the vehicle.

Figure 3:
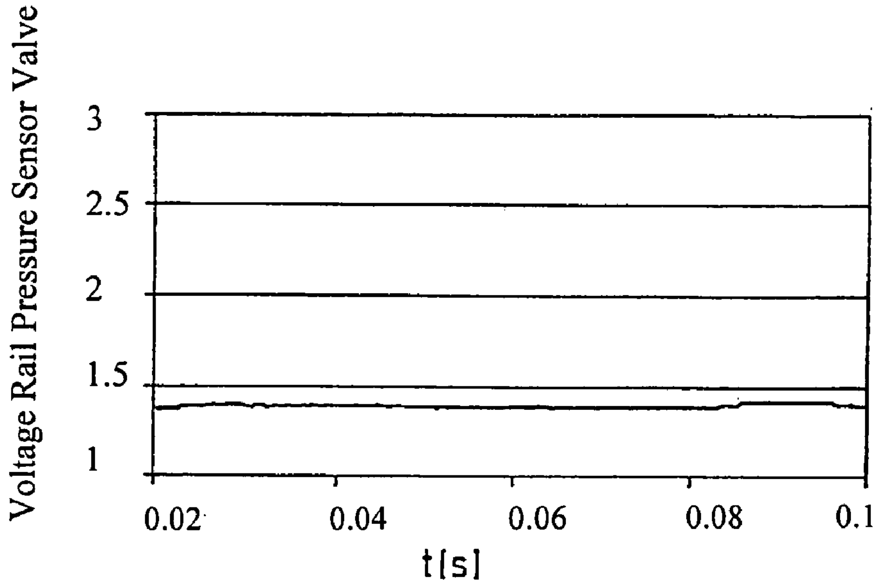
FIG. 3, a graph plotting the voltage of a rail pressure sensor over time for an intact high-pressure pump.

In FIG. 3, the raw signal of the rail pressure sensor is plotted in volts, over time in seconds. The injection quantity is set at 10 mg. The pressure limiting valve is closed. Over the period of time observed, the raw signal of the rail pressure sensor has a relatively constant value of approximately 1.4 volts. The rail pressure is accordingly stable.

Figure 4:
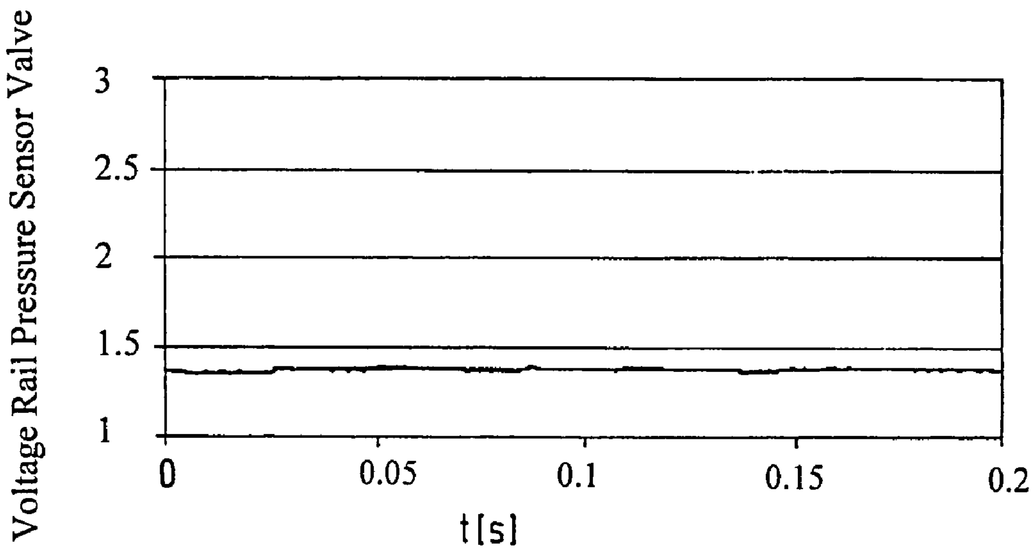
FIG. 4, a graph plotting the voltage of the rail pressure sensor over time, if the suction valve is defective.

In FIG. 4, a suction valve is defective. In comparison to FIG. 3, no substantial distinction can be seen, since if a suction valve is defective, the two pump elements that remain furnish enough replenishing quantity, and because of the low pumping quantities in idling, no oscillation of high amplitude occurs. The pressure valve in the element having the defective suction valve remains constantly closed.

Figure 5:
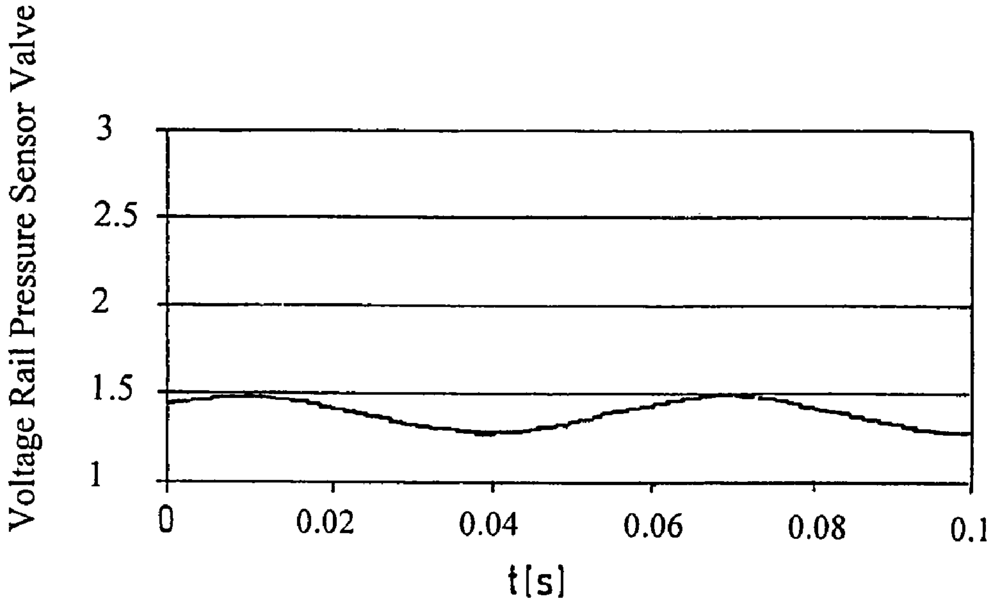
FIG. 5, a graph plotting the voltage of the rail pressure sensor over time, if the pressure valve is defective.

In FIG. 5, the raw signal of the rail pressure sensor is plotted over time when a pressure valve is defective. As FIG.

5 shows, the raw signal of the rail pressure sensor fluctuates between approximately 1.3 and 1.5 volts. The oscillation occurs because the defective pressure valve does not close. Accordingly, in the pumping stroke of the associated piston, a certain quantity is indeed pumped into the high-pressure fuel reservoir. However, in the ensuing intake stroke of the piston, this quantity is reaspirated via the defective pressure valve. Thus a certain quantity of fuel is shifted back and forth in the high-pressure region, leading to the oscillation shown in FIG. 5.

In a second part of the testing method of the invention, the engine is still running in the idling mode. Via a special function of the control unit, the metering unit is opened in order to increase the pumping quantity. The increased pumping quantity causes the pressure limiting valve to open. The same effect is attained if a pressure regulating valve at the high-pressure pump is opened into the low-pressure region.

Figure 6:
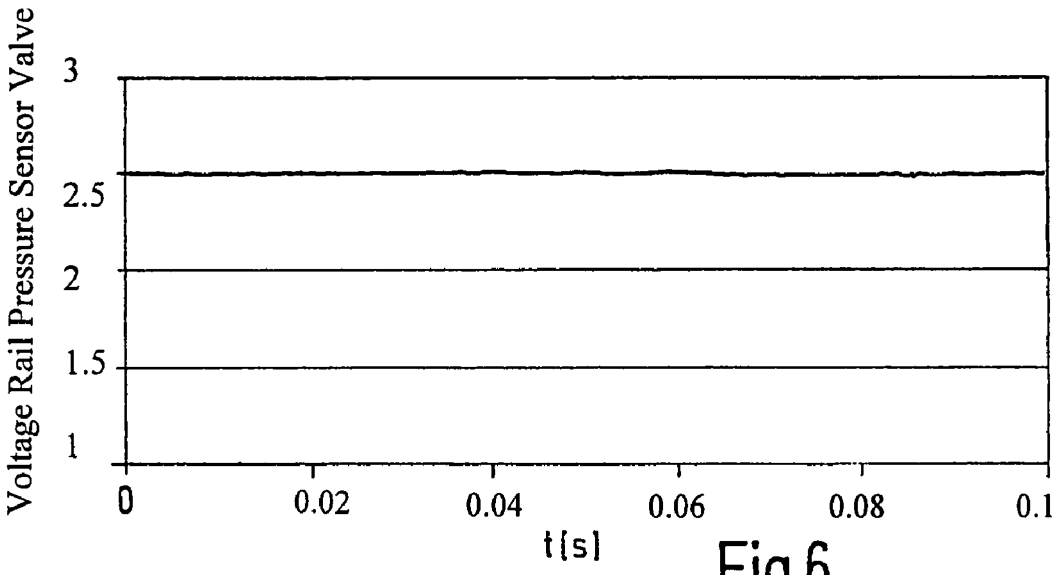
FIG. 6, a graph plotting the voltage of the rail pressure sensor over time with an open pressure limiting valve and an intact high-pressure pump.

In FIG. 6, it can be seen that in this artificial elevation of the rail pressure, the raw signal of the rail pressure sensor increases from approximately 1.4 to approximately 2.5 volts.

Figure 7:
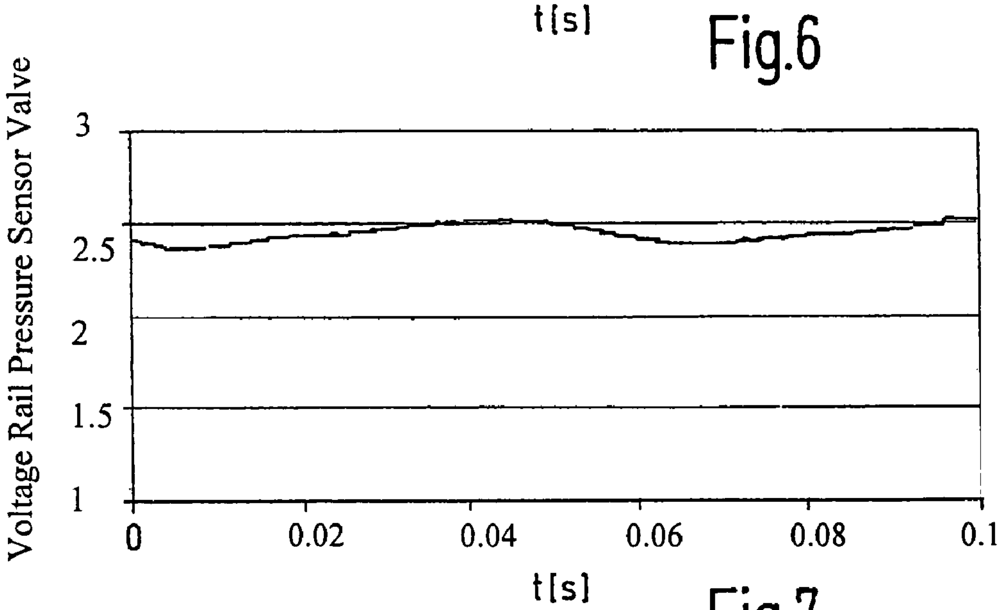
FIG. 7, a graph plotting the voltage of the rail pressure sensor over time with an open pressure limiting valve and a defective suction valve.

In FIG. 7, the raw signal of the rail pressure sensor is plotted over time when a suction valve is defective. At the higher pressure, an oscillation at the same frequency as in FIG. 5 results, since because of the defective suction valve, one pump element is not pumping. At the elevated pressure and the increased pumping quantity, the failure of the pump element is not compensated for by the other two pump elements.

Figure 8:
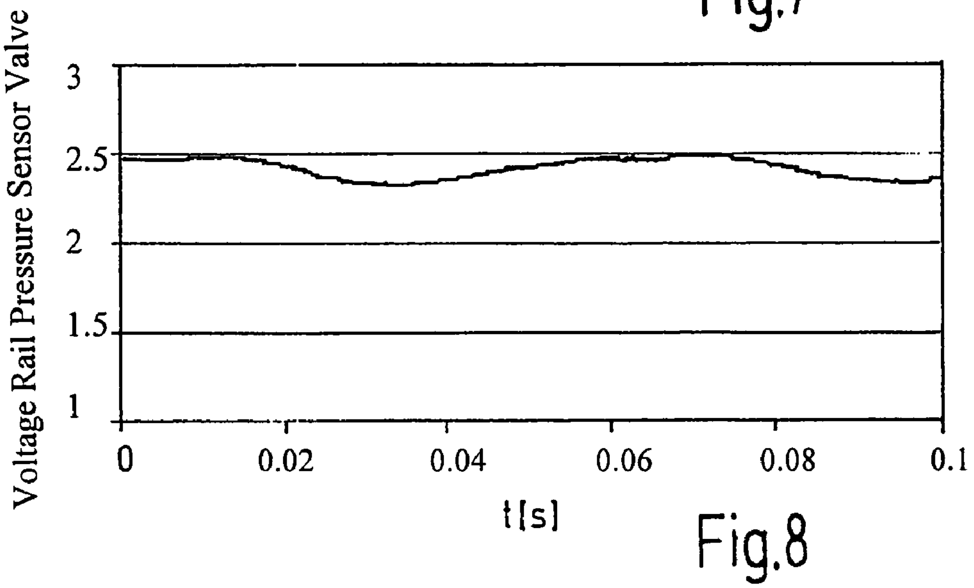
FIG. 8, a graph plotting the voltage of the rail pressure sensor over time with an open pressure limiting valve and a defective pressure valve.

In FIG. 8, the raw signal of the rail pressure sensor is plotted over time when a pressure valve is defective. Once again, an oscillation of the same frequency occurs.

By way of a comparison of two pumping operations with the pressure limiting valve open and the pressure limiting valve closed, it can be ascertained whether it is a suction valve or a pressure valve in the high-pressure pump that is defective. By the testing method of the invention, if it is suspected that a high-pressure pump is defective, the function of the pumping of all the pump elements can be tested, and thus indirectly the metering unit can be excluded as the source of the defect. Moreover, uneven pumping of the pump because of suction valves with different opening pressures can be detected, since the different opening pressures lead to a similar oscillating behavior.

The foregoing relates to a preferred exemplary embodiment of the invention, it being understood that other variants and embodiments thereof are possible within the spirit and scope of the invention, the latter being defined by the appended claims.

The invention claimed is:

1. A method for testing the function of a high-pressure pump of a fuel supply system for an internal combustion engine without requiring the removal of the high-pressure pump from the fuel supply system, said pump having a plurality of pump elements each defining a respective work chamber which is in communication, via a suction valve with a low-pressure region, from which fuel can be aspirated, and via a pressure valve with a high-pressure region which includes a central high-pressure fuel reservoir, serving to supply fuel to the internal combustion engine, into which high-pressure reservoir the high-pressure pump pumps the fuel aspirated from the low-pressure region, and the pressure of which is detected by a rail pressure sensor, said engine including a control unit integrated with the engine, the method comprising connecting an adapter having an interface for a connection cable to the rail pressure sensor, connecting one end of a cable to the interface of the adapter, connecting the second end of the cable to an evaluation unit external to the control unit integrated with the engine, and using the evaluation unit and the values detected by the rail pressure sensor in the built-in state of the high-pressure pump in operation of the engine for testing the function of the high-pressure pump, wherein a signal of the rail pressure sensor is evaluated over time with respect to characteristic rail pressure oscillations.

2. The method as defined by claim 1, wherein the testing is done in the idling mode of the engine.

3. The method as defined by claim 2, wherein the raw signal of the rail pressure sensor is used as the measured value for the rail pressure.

4. The method as defined by claim 2, further comprising opening a pressure regulating valve, with which the high-pressure pump is equipped, in order to increase the pumping quantity of the high-pressure pump.

5. The method as defined by claim 2, wherein the pumping quantity of the high-pressure pump is increased by opening a pressure limiting valve, with which the high-pressure fuel reservoir is equipped.

6. The method as defined by claim 5, further comprising opening a metering unit which is connected upstream of the high-pressure pump in order to increase the pumping quantity of the high-pressure pump, until the pressure limiting valve opens.

7. The method as defined by claim 1, wherein the raw signal of the rail pressure sensor is used as the measured value for the rail pressure.

8. The method as defined by claim 7, further comprising opening a pressure regulating valve, with which the high-pressure pump is equipped, in order to increase the pumping quantity of the high-pressure pump.

9. The method as defined by claim 7, wherein the pumping quantity of the high-pressure pump is increased by opening a pressure limiting valve, with which the high-pressure fuel reservoir is equipped.

10. The method as defined by claim 9, further comprising opening a metering unit which is connected upstream of the high-pressure pump in order to increase the pumping quantity of the high-pressure pump, until the pressure limiting valve opens.

11. The method as defined by claim 1, further comprising opening a pressure regulating valve, with which the high-pressure pump is equipped, in order to increase the pumping quantity of the high-pressure pump.

12. The method as defined by claim 1, wherein the pumping quantity of the high-pressure pump is increased by opening a pressure limiting valve, with which the high-pressure fuel reservoir is equipped.

13. The method as defined by claim 12, further comprising opening a metering unit which is connected upstream of the high-pressure pump in order to increase the pumping quantity of the high-pressure pump, until the pressure limiting valve opens.

14. The method as defined by claim 1, wherein the evaluation unit is an oscilloscope.

15. The method as defined by claim 1, wherein the evaluation unit is a testing device with the function of an oscilloscope.

* * * * *